3,344,058
CATALYTIC HYDROCRACKING PROCESS
WITH A CRYSTALLINE ALUMINOSILI-
CATE CATALYST
Joseph N. Miale, Trenton, N.J., assignor to Mobil Oil
Corporation, a corporation of New York
No Drawing. Filed Feb. 8, 1965, Ser. No. 431,180
14 Claims. (Cl. 208—111)

This application is a continuation-in-part of my application Ser. No. 86,582, filed Feb. 2, 1961, now abandoned.

This invention relates to an improved hydrocracking process. More particularly, the present invention is directed to a selective process for hydrocracking a portion of a mixture of hydrocarbons of varying molecular size in the presence of a catalytic composition comprising a dehydrogenation component distributed within the pores of a crystalline aluminosilicate zeolite characterized by rigid three-dimensional networks, and uniform interstitial dimensions.

Hydrocracking operations have heretofore been proposed in which there is employed a catalyst comprising one or more components exhibiting dehydrogenation activity, such as the metals of Groups V, VI and VIII of the Periodic Table either in elemental form or in the form of the oxides or sulfides of these metals. Such components have been deposited by impregnation on alumina and silica-alumina supports. In general, such supported catalysts have been capable of catalytically effecting a variety of complex reactions attributable to hydrocracking conversion. In such reactions, however, there has been, in so far as known, no marked selectivity for any particular reactant or group of reactants.

The process of the present invention affords a method for selectively hydrocracking a portion of a hydrocarbon charge consisting of components of different molecular sizes. The selectivity attained in accordance with the present process is believed attributable to the solid, crystalline zeolitic structure of the catalyst employed characterized by rigid three-dimensional networks and uniform interstitial dimensions in which the dehydrogenation component is distributed. By associating the dehydrogenation component in highly dispersed form with the intracrystalline spaces for the hydrocracking reaction which is to be catalyzed thereby, only such conversion paths are obtained which involve reactant or product molecules of specific shapes or sizes. Such zeolites wherein only molecules of particular size and shape are able to enter have been referred to as molecular sieves.

In one embodiment, the present invention affords a process for selectively hydrocracking a hydrocarbon charge consisting of components of different molecular size by contacting the charge in the presence of hydrogen under controlled conditions of temperature with a crystalline aluminosilicate zeolite having rigid three-dimensional networks combined with a dehydrogenation component, a major portion of which is distributed within the interior of the zeolite, such zeolite having uniform interstitial dimensions sufficiently large to admit a portion of said components, but sufficiently small to exclude a remaining portion of said components, whereby the portion of said components admitted to contact with the active dehydrogenation surfaces preferentially undergo hydrocracking to the substantial exclusion of the remaining portion of the hydrocarbon charge.

In another embodiment, the present invention provides a process for selectively hydrocracking a hydrocarbon charge consisting of components of different molecular size by contacting the charge under the above-noted conditions with a crystalline aluminosilicate zeolite having rigid three-dimensional networks combined with a dehydrogenation component, a major portion of which is distributed within the interior of the zeolite, such zeolite having uniform pores approximately 5 Angstroms in diameter capable of admitting a portion of said charge components, and excluding a remaining portion of said charge components whereby the admitted portion of the charge making contact with the active dehydrogenation surfaces undergoes hydrocracking to lighter products, and removing the products so obtained from the hydrocracking zone.

In a further aspect, the process described herein provides a method for purification of a gaseous stream in accordance with which the stream undergoing purification is mixed with hydrogen, passed over a catalyst as specified above, and the products of hydrocracking subsequently separated from the remaining portion of the charge stream by conventional means such as, for example, adsorption or distillation.

Molecular seive materials are composed of crystalline metal aluminosilicates, which have been heated to remove their water of hydration. The crystals obtained upon dehydration are usually porous, the pores having uniform molecular dimensions, generally between about 4 and about 15 angstrom units in diameter. Each crystal of molecular sieve material contains literally billions of tiny cavities or cages interconnected by channels of unvarying diameter. The size and portion of the metal ions in the crystal control the effective diameter of the interconnecting channels. As initially prepared, the metal of the aluminosilicate is an alkali or alkaline earth metal. Sodium and calcium crystalline aluminosilicates of the molecular sieve type are available commercially, and will ordinarily be employed for subsequent treatment to introduce a dehydrogenation component into the pores thereof. It is, however, possible to initially utilize a molecular sieve material wherein the metal ion is other than a sodium or calcium ion or wherein such cation has been replaced by a hydrogen ion. Molecular sieve materials of the A type, X type, Y type or other well known forms are available, and include the 13X and 10X types which are sodium and sodium-calcium crystalline aluminosilicates, capable of adsorbing molecules whose critical diameter is less than about 10 angstrom units and the 4A and 5A types which are sodium and sodium-calcium crystalline aluminosilicates having channel diameter which will permit adsorption of molecules smaller than about 4 and 5 angstrom units, respectively. Preparation of these molecular sieves is well known, having been described in the literature, for example in U.S. 2,882,243 and U.S. 2,882,244. The molecular sieve material utilized in preparation of the catalyst employed in the present process is essentially characterized by uniform pore characteristics capable of affording separation between components of different molecular size making up the hydrocarbon charge. Particularly effective molecular sieve materials for such purpose are those having uniform effective pore diameters within the approximate range of 4 to 7 angstrom units. An especially feasible starting material is the commercially available 5A molecular sieve.

Thus, a particularly advantageous catalytic composition is one consisting essentially of a dehydrogenation component dispersed within the pores of a crystalline zeolite structure characterized by rigid three-dimensional networks and uniform pores approximately 5 Angstroms in diameter. Such composition is catalytically active and also very selective in effecting desired hydrocracking of hydrocarbon mixtures. Selectivity is attributable to the uniform pore structure of the composition affording exclusion of branched-chain and other large molecules from the very narrow channels having a pore diameter of about 5 Angstrom units. Thus, the channels in such composition permit adsorption of normal paraffins and olefins having a molecular size smaller than 5 Angstroms while excluding molecules of a size larger than 5 Angstroms such as for example, iso-paraffins, iso-olefins and cyclic hydrocarbons. It is accordingly believed that the dehydrogenation activity sites are shielded from molecules exceeding a certain critical diameter, permitting the catalytic compositions described herein to exhibit high hydrocracking activity for selected members of a hydrocarbon class. Such selective high activity is accordingly restricted to those molecules which do not exceed a maximum critical diameter corresponding to the particular port size of the crystalline zeolite. It appears that the major portion of the distributed dehydrogenation component is situated within the crystals of the zeolite, and that the crystals of the zeolite admit or reject a reactant molecule depending upon whether or not the diameter of the molecules exceeds the size of the opening in the crystal face. Thus, it appears that a molecule which cannot enter the crystal cannot undergo any substantial hydrocracking.

A component exhibiting dehydrogenation activity is encased within the crystalline structure of the aluminosilicate above-described. Suitable dehydrogenation components include one or more of the metals of Groups V, VI and VIII of the Periodic Table either in elemental form or in the form of the oxides or sulfides of these metals. Representative of these metals are molybdenum, chromium, tungsten, iron, vanadium, cobalt, nickel, and metals of the platinum group, i.e. platinum, palladium, osmium, rhodium, ruthenium and iridium as well as combinations of these metals, their oxides or sulfides. Thus, a particularly desirable combination of metal oxides is that of the oxides of cobalt, and molybdenum encased within the structure of the hereinabove described crystalline aluminosilicate.

Incorporation of one or more of the above-indicated metals may be achieved in accordance with the method described in copending application Serial No. 319,639, filed October 29, 1963. In accordance with such method, a solution of a water-soluble metal compound is introduced into the zeolite forming mixture prior to crystallization of the zeolite. The resulting wet metal-containing crystalline zeolite is thereafter dried and subjected to a thermal treatment, preferably by initially heating in air, and thereafter in hydrogen. The finished catalyst is dry, and contains the dehydrogenation component distributed in the zeolitic structure in metallic form.

Catalytically active dehydrogenation components may also be introduced into the crystal aluminosilicate lattice by suitably contacting the zeolitic solids with solutions containing ions of the metal corresponding to the metal cation of the crystalline aluminosilicate undergoing treatment, and ions of the dehydrogenation metal, which it is desired to introduce into the interior of the zeolitic structure, such as cobalt, molybdenum, nickel, iron, etc. Such competing ion technique serves to effectively introduce the dehydrogenation component into the interior of the crystalline aluminosilicate zeolite. The ion ratio of dehydrogenation metal to metal corresponding to the metal cation of the crystalline aluminosilicate being treated is generally in the range of 1:1 to 1:200 and preferably 1:5 to 1:100. Thus, for example, a portion of the sodium or calcium ions normally contained in the molecular sieve structure may be zeolitically replaced with a number of various other ions such as cobalt, nickel, iron, tungsten, vanadium, molybdenum and chromium. Replacement is suitably accomplished by contacting the molecular sieve with a solution containing sodium or calcium ions, and an ionizable compound of the dehydrogenation metal which is to be zeolitically introduced into the molecular sieve structure for a sufficient time to bring about the extent of desired introduction of the dehydrogenation metal. After such treatment, the molecular sieve is water-washed and calcined. In some instances, it may be desirable to convert the dehydrogenation component to the sulfide.

It is essential that the major portion of the active dehydrogenation metal-containing surfaces be within the interior of the crystalline aluminosilicate rather than on the exterior surface thereof. Catalysts in which active dehydrogenation metal-containing surfaces were within the interior of the crystalline aluminosilicate possessed a much greater selectivity for hydrocracking than the catalysts in which active dehydrogenation metal-containing surfaces were on the exterior of the crystalline aluminosilicate.

To insure removal of external dehydrogenation cations, it is desirable to treat the exchanged zeolite with a solution containing an ion sufficiently large to be incapable of penetrating into the interior of the zeolite, and capable of removing by base exchange any external dehydrogenation metal ions. Suitable solutions for such purpose include those of tetramethyl ammonium chloride, and calcium chloride in dimethylformamide. This subject matter is more particularly described and claimed in my copending application Ser. No. 639,046, filed May 17, 1967.

The amount of dehydrogenation component encased within the crystalline structure of the aluminosilicate may vary widely and will depend upon the charge stock undergoing selective hydrocracking as well as on the particular nature of the dehydrogenation component. Generally, the amount of dehydrogenation component will be within the range of about 0.01 to 25 percent by weight. When a metal of the platinum series is employed, the amount thereof will generally range from 0.01 to 5 weight percent. With other dehydrogenation component such as the oxides or sulfides of molybdenum, cobalt, tungsten, chromium, iron, vanadium, and nickel, the amounts employed will generally be within the approximate range of 2 to 25 weight percent, it being understood that in any instance, the amount of dehydrogenation component present will be such as to afford selective hydrocracking of the portion of the hydrocarbon charge mixture making contact with the active dehydrogenation catalytic surfaces and undergoing conversion.

Hydrocarbon charge stocks undergoing hydrocracking in accordance with this invention comprise hydrocarbon mixtures containing at least two hydrocarbons of different molecular size, one of which is capable of entering the pores of the encasing aluminosilicate structure of the catalyst employed and the other of which is excluded from entering such pores. Suitable petroleum charge stocks include hydrocarbon fractions having an initial boiling point of at least about 400° F., a 50 percent point of at least about 500° F. and an end point of at least about 600° F. Such hydrocarbon fractions include gas oils, residual oils, cycle stocks, whole topped crudes and heavy hydrocarbon fractions derived by destructive hydrogenation of coal, tars, pitches, asphalts and the like. As will be recognized, the distillation of higher boiling petroleum fractions (above 750° F.) must be carried out under vacuum in order to avoid thermal cracking. The boiling temperatures utilized herein, however, are expressed in terms for convenience of the boiling point corrected to atmospheric pressure.

Hydrocracking in accordance with the present invention is carried out at a temperature in the range of 400° F. to 790° F., and preferably in the range of 550° F. to 790° F. It is essential to achieve maximum benefit and advantage of the present process that the temperature not exceed 790° F. at higher temperature, the unexpected improvement in selectivity obtained with the present process is not achieved. Thus, as will be evident from comparative data hereinafter presented, there is a marked decrease in selectivity, as the temperature of hydrocracking exceeds 790° F. The hydrogen pressure employed in the present process is generally within the range of about 100 and about 3000 p.s.i.g., and preferably, about 350 to about 2000 p.s.i.g. The liquid hourly space velocity, i.e. the liquid volume of hydrocarbon per hour per volume of catalyst is between about 0.1 and about 4. In general, the molar ratio of hydrogen to hydrocarbon charge employed is between about 2 and about 80, and preferably between about 5 and about 50.

The process of this invention may be carried out in any equipment suitable for catalytic operations. The process may be operated batchwise. It is preferable, however, and generally more feasible to operate continuously. Accordingly, the process is adapted to operations using a fixed bed of catalyst. Also, the process can be operated using a moving bed of catalyst wherein the hydrocarbon flow may be concurrent or countercurrent to the catalyst flow. A fluid type of operation may also be employed with the catalyst described herein. After selective hydrocracking, the resulting products may be suitably separated from unconverted components and from each other by conventional means such as adsorption, distillation, etc.

The following examples will serve to illustrate the process of this invention without limiting the same:

Example 1

Seventy-eight grams of sodium aluminate and 113 grams of sodium metasilicate were separately dissolved in 275 ml. portions of water. Platinous ammine chloride i.e. $Pt(NH_3)_4Cl_2$ in an amount of 0.55 grams was dissolved in 70 ml. of water and added to the sodium aluminate solution. The latter was then mixed with the silicate solution. A resulting white precipitate formed. The mixture was then stirred under reflux conditions at a temperature of about 102° C. for 7 hours and filtered. After being washed with water, the crystalline material was washed with calcium chloride solution to convert it from the sodium form to the calicum form characterized by a uniform structure made up of pores approximately 5 Angstroms in diameter. The solid was then washed with water until free of chloride ion, calcined 2 hours in air at 800° F. and thereafter in hydrogen for 2 hours at 800° F. The crystalline zeolite product had a platinum content of 0.31 percent by weight.

A 0.15 gram sample of the above material was introduced as catalyst in a microreactor by sprinkling the same in the form of 600–100 mesh powder on a small piece of glass wool, rolling the latter into a cylinder form and placing in the reactor tube. The catalyst was treated with 60 cc./minute flow of a hydrogen stream for 30 minutes at a temperature of 800° F.

A sample of n-octane was allowed to evaporate into an evacuated vessel until the pressure was 10 millimeters of mercury. The vessel was then filled to atmospheric pressure with hydrogen. A 2 cc. sample of such n-octane charge was introduced into the aforementioned hydrogen stream, passed over the catalyst and into a chromatographic column. Analysis of the product as detected by a hot wire conductivity cell showed 30 percent cracked products. The same procedure with iso-octane showed no conversion. The method was repeated at temperatures of 550 to 800° F. with this catalyst, as well as with a large pore platinum-containing crystalline aluminosilicate zeolite, i.e. 13X zeolite containing .65 weight percent platinum; a 5A zeolite free of platinum and a platinum-alumina reforming catalyst having a platinum content of 1.1 weight percent. The charge stocks employed included n-octane, isooctane, a mixture of isobutane, n-hexane, methylcyclopentane and 3-methylpentane; n-butane; and a mixture of isobutane and n-butane. The catalyst consisting essentially of platinum encased within the structure of a crystalline alminosilicate characterized by a uniform structure having an effective pore diameter of approximately 5 angstrom units was the only one exhibiting selectivity. The results obtained are shown below in Table I.

TABLE I

| Example | Charge* | Temp., ° F. | Pt/5A, wt. percent Cracked | Pt/13X, wt. percent Cracked | Pt on Al₂O₃, wt. percent Cracked | 5A |
|---|---|---|---|---|---|---|
| 1 | n-C₈ | 800 | 30.0 | 68.1 | 60.6 | 0 |
| 2 | i-C₈ | 800 | 0 | 83.0 | 72.4 | 0 |
| 3 | n-C₈ | 550 | 3.1 | 0 | | |
| 4 | i-C₈ | 550 | 0 | | | |
| 5 | n-C₈ | 600 | 7.2 | 0 | 0 | |
| 6 | i-C₈ | 600 | 0 | 0 | 0 | |
| 7 | n-C₈ | 650 | 6.6 | 0 | | |
| 8 | i-C₈ | 650 | 0 | 2.6 | | |
| 9 | n-C₈ | 700 | 6.1 | 14.0 | 28.6 | |
| 10 | i-C₈ | 700 | 0 | 16.6 | 24.8 | |
| 11 | n-C₈ | 750 | 12.4 | | | |
| 12 | i-C₈ | 750 | 0 | | | |
| 13 | i-C₄, n-C₆, Methylcyclopentane, 3 MeC₅ | 800 | 0 | i-C₄:4.1 | i-C₄:31.2 | 0 |
| 14 | n-C₄ | 800 | | 10.9 | 50.9 | 0 |
| 15 | i-C₄, n-C₄ | 600–700 | | 0 | 0 | |

*LHSV: 2.3 for C₈'s, 13.2 for C₄'s.

Example 16

Two grams of 5A aluminosilicate zeolite were contacted for 24 hours with a 100 cc. solution containing 0.6 grams $Co^{++}$ from $CoCl_2.6H_2O$ and 20.4 grams $Ca^{++}$ from $CaCl_2$, the ratio of $Co^{++}$ to $Ca^{++}$ being 1 to 50. The catalyst was filtered and washed with approximately 50 volumes of water to remove unexchanged surface ions, and thereafter treated with several batches of about 5 volumes each of 4 molar tetramethyl ammonium chloride to exchange out external cations. The material was then filtered, washed with about 10 volumes of water and dried in an oven at about 240° F.

A 0.15 gram sample of the above catalyst was introduced into a microreactor in the manner described in Example 1. Hydrocracking of iso and normal octanes at temperatures ranging from 550 to 740° F. were carried out with this catalyst. The results are shown below in Table II.

TABLE II

| Example | Temp., ° F. | Charge | Co/5A, wt. Percent Cracked |
|---|---|---|---|
| 16 | 550 | i-C₈ | 0 |
| 17 | 550 | n-C₈ | 38 |
| 18 | 600 | i-C₈ | 1.0 |
| 19 | 600 | n-C₈ | 44 |
| 20 | 630 | i-C₈ | |
| 21 | 630 | n-C₈ | |
| 22 | 650 | i-C₈ | 3 |
| 23 | 650 | n-C₈ | 63 |
| 24 | 670 | i-C₈ | |
| 25 | 670 | n-C₈ | |
| 26 | 700 | i-C₈ | 12 |
| 27 | 700 | n-C₈ | 87 |
| 28 | 740 | i-C₈ | 41 |
| 29 | 740 | n-C₈ | 90 |

As will be evident from the foregoing data, the catalyst employed in every instance exhibited hydrocracking selectivity for the normal octanes as compared with the iso-octanes. Within the temperature range employed, selectivity was greater at the lower temperatures, with optimum temperatures being below about 700° F.

Example 30

Two grams of 5A aluminosilicate zeolite were contacted for 24 hours with a 100 cc. solution containing 0.6 grams Ni++ from NiCl$_2$.6H$_2$O and 20.4 grams Ca++ from CaCl$_2$, the ratio of Ni++ to Ca++ being 1 to 50. The catalyst was filtered and washed with approximately 50 volumes of water to remove unexchanged surface ions, and thereafter treated with several batches of about 5 volumes each of 4 molar tetramethyl ammonium chloride to exchange out external cations. The material was then filtered, washed with about 10 volumes of water and dried in an oven at about 240° F.

A 0.15 gram sample of the above catalyst was introduced into a microreactor in the manner described in Example 1. Hydrocracking of iso and normal octanes at temperatures ranging from 550 to 700° F. were carried out with this catalyst. The results are shown in Table III.

TABLE III

| Example | Temp., °F. | Charge | Ni/5A, wt. Percent Cracked |
|---|---|---|---|
| 30 | 550 | i-C$_8$ | 0 |
| 31 | 550 | n-C$_8$ | 32 |
| 32 | 600 | i-C$_8$ | 1.2 |
| 33 | 600 | n-C$_8$ | 82 |
| 34 | 630 | i-C$_8$ | 23 |
| 35 | 630 | n-C$_8$ | 83 |
| 36 | 650 | i-C$_8$ | |
| 37 | 650 | n-C$_8$ | |
| 38 | 670 | i-C$_8$ | 27.5 |
| 39 | 670 | n-C$_8$ | 83 |
| 40 | 700 | i-C$_8$ | 38 |
| 41 | 700 | n-C$_8$ | 87 |

The catalyst employed in every case again exhibited hydrocracking selectivity for the normal octanes as compared with the iso-octanes. Within the temperature range employed, selectivity was greater at the lower temperatures, with optimum temperatures being below about 670° F.

The following comparative examples will serve to show that a crystalline aluminosilicate zeolite having a dehydrogenation metal deposited thereon introduced by simple base exchange does not possess the highly selective activity characterizing the catalysts employed in the process of the present process wherein the surfaces having dehydrogenation activity are contained within the interior of the crystalline aluminosilicate zeolite. These comparative examples further serve to illustrate that the use of hydrocracking temperatures in the present process in excess of 790° F. are to be avoided.

Example 42

A batch of 5A crystalline aluminosilicate was base exchanged using a solution containing cobaltous chloride and calcium chloride, the ratio of Co++ to Ca++ being 1 to 50. The mixture was rolled for 4 hours, vacuum filtered, water-washed to remove unexchanged surface ions, and thereafter treated several times with a solution of calcium chloride in dimethylformamide. The last step served to remove the cobalt cations from the exterior catalyst surface.

Example 43

A batch of 5A crystalline aluminosilicate was base exchanged in a manner identical with that of Example 42, except that the initial exchange solution contained no calcium chloride, thereby eliminating the competitive effect which distributes a desired cation uniformly throughout the catalyst surface. Subsequent treatment with a solution of calcium chloride in dimethylformamide was not employed so that cobalt cations remained on the exterior catalyst surface.

Example 44

A batch of 4A crystalline aluminosilicate was base exchanged by contacting 4A crystalline aluminosilicate for 1 hour with a 20 percent aqueous solution of cobaltous chloride, and was thereafter removed from such solution.

Example 45

A batch of 5A crystalline aluminosilicate was treated in a manner identical with that of Example 42, except that nickelous chloride was employed in place of cobaltous chloride.

Example 46

A batch of 5A crystalline aluminosilicate was treated in a manner identical with that of Example 43, except that nickelous chloride was employed in place of cobaltous chloride.

Example 47

A batch of 4A crystalline aluminosilicate was treated in a manner identical with that of Example 44, except that nickelous chloride was employed in place of cobaltous chloride.

After being calcined at 900° F., the catalysts of Examples 42–47 were tested for ability to hydrocrack iso and normal octanes at atmospheric pressure and 0.15 second contact time utilizing the technique described in Example 1. The results are set forth below:

| Catalyst Example | Temperature | Cracked Products, Wt. Percent from — | | Ratio n-C$_8$ Conv./ i-C$_8$ Conv. |
|---|---|---|---|---|
| | | iso-octane | n-octane | |
| 42 | 790 | 34.1 | 71.0 | 2.08 |
| | 850 | 57.2 | 82.5 | 1.44 |
| 43 | 790 | 79.3 | 95.4 | 1.20 |
| | 850 | 87.8 | 97.4 | 1.11 |
| 44 | 790 | 54.3 | 81.3 | 1.50 |
| | 850 | 64.9 | 87.4 | 1.35 |
| 45 | 790 | 13 | 65.2 | 5.02 |
| | 850 | 21.7 | 69.9 | 3.22 |
| 46 | 790 | 100 | 100 | 1.0 |
| 47 | 790 | 96.1 | 98.3 | 1.02 |
| | 850 | 96.8 | 96.0 | 0.99 |

It will be seen from the above tabulated data that the catalysts of Examples 42 and 45, wherein the active hydrogenation metal-containing surfaces were within the interior of the crystalline aluminosilicate possessed a much greater selectivity for cracking normal octane than the catalysts of Examples 43, 44, 46 and 47, in which active hydrogenation metal-containing surfaces were on the exterior of the crystalline aluminosilicate. It is further to be noted from the tabulated data, and particularly the data of Examples 42 and 45, illustrative of the present invention, that there is a marked decrease in selectivity as the temperature is raised above 790° F.

It will accordingly be understood that the above description is merely illustrative of preferred embodiments of the invention of which many variations may be made within the scope of the following claims by those skilled in the art without departing from the spirit thereof.

I claim:

1. A process for selectively hydrocracking a hydrocarbon charge stock consisting of components of different molecular size, by contacting the charge in the presence of hydrogen at a temperature between about 400° F. and 790° F. under hydrocracking conditions, with a crystalline aluminosilicate zeolite having rigid three-dimensional networks combined with a dehydrogenation component, a major portion of which is deposited within the interior of said crystalline aluminosilicate zeolite by contact of said zeolite with a solution containing ions of a metal corresponding to the metal cation of the crystalline aluminosilicate zeolite undergoing treatment, and ions of the dehydrogenation component, the ion ratio of said dehydrogenation component to metal corresponding to the metal cation of the crystalline aluminosilicate zeolite being in the range of 1:1 to 1:200, which zeolite has uniform interstitial dimensions sufficiently large to admit a portion of said components, but sufficiently small to exclude a remaining portion of said components, whereby the portion of said components admitted to contact with the active dehydrogenation surfaces preferentially undergo hydrocracking to the substantial exclusion of the remaining portion of said hydrocarbon charge.

2. A process for selectively hydrocracking a hydrocarbon charge consisting of components of different molecular size by contacting the charge in the presence of hydrogen at a temperature between about 550° F. and 790° F. under hydrocracking conditions with a crystalline aluminosilicate zeolite having rigid three-dimensional networks combined with a dehydrogenation component, a major portion of which is distributed within the interior of said crystalline aluminosilicate zeolite by contact of said zeolite with a solution containing ions of a metal corresponding to the metal cation of the crystalline aluminosilicate zeolite undergoing treatment, and ions of the dehydrogenation component, the ion ratio of said dehydrogenation component to metal corresponding to the metal cation of the crystalline aluminosilicate zeolite being in the range of 1:1 to 1:200, which zeolite has uniform pores approximately 5 Angstroms in diameter capable of admitting a portion of said charge components and excluding a remaining portion of said charge components, whereby the admitted portion of the charge making contact with the active dehydrogenation surfaces undergoes hydrocracking to lighter products, and removing products so obtained from the hydrocracking zone.

3. A process for selectively hydrocracking a hydrocarbon charge consisting of components of different molecular sizes which comprises contacting said charge in the presence of hydrogen at a temperature between 400° F. and 790° F. under hydrocracking conditions with a crystalline aluminosilicate zeolite having rigid three-dimensional networks combined with a Group VIII metal-containing dehydrogenation component by contact of said zeolite with a solution containing ions of a metal corresponding to the metal cation of the crystalline aluminosilicate zeolite undergoing treatment, and ions of the dehydrogenation component, the ion ratio of said dehydrogenation component to metal corresponding to the metal cation of the crystalline aluminosilicate zeolite being in the range of 1:1 to 1:200, which zeolite has uniform interstitial dimensions sufficiently large to admit a portion of said components, but sufficiently small to exclude a remaining portion of said components, whereby the portion of said components admitted to contact with the active dehydrogenation surfaces preferentially undergo hydrocracking to the substantial exclusion of the remaining portion of said hydrocarbon charge.

4. A process for selectively hydrocracking a hydrocarbon charge consisting of components of different molecular size by contacting the charge in the presence of hydrogen at a temperature between 400° F. and 790° F. under hydrocracking conditions with a crystalline aluminosilicate zeolite having rigid three-dimensional networks combined with a dehydrogenation component, a major portion of which is distributed within the interior of said zeolite by growing crystals of said zeolite in the presence of an aqueous solution of said dehydrogenation component, which zeolite has uniform interstitial dimensions sufficiently large to admit a portion of said components, but sufficiently small to exclude a remaining portion of said components, whereby the portion of said components admitted to contact with the active dehydrogenation surfaces preferentially undergo hydrocracking to the substantial exclusion of the remaining portion of said hydrocarbon charge.

5. A process for selectively hydrocracking a hydrocarbon charge consisting of components of different molecular size by contacting the charge in the presence of hydrogen at a temperature between 400° F. and 790° F. under hydrocracking conditions with a crystalline aluminosilicate zeolite having rigid three-dimensional networks combined with a dehydrogenation component, a major portion of which is distributed within the interior of said zeolite by contact of said zeolite with a solution containing ions of alkaline earth metal and ions of the dehydrogenation component, the ion ratio of dehydrogenation component to alkaline earth metal in said solution being in the range of 1:1 to 1:200, which zeolite has uniform interstitial dimensions sufficiently large to admit a portion of said components, but sufficiently small to exclude a remaining portion of said components, whereby the portion of said components admitted to contact with the active dehydrogenation surfaces preferentially undergo hydrocracking to the substantial exclusion of the remaining portion of said hydrocarbon charge.

6. A process for selectively hydrocracking a hydrocarbon charge consisting of components of different molecular size by contacting the charge in the presence of hydrogen at a temperature between 550° F. and 790° F. under hydrocracking conditions with a crystalline aluminosilicate zeolite having rigid three-dimensional networks combined with a Group VIII metal containing dehydrogenation component, a major portion of which is distributed within the interior of said zeolite by contact of said zeolite with a solution containing ions of alkaline earth metal and ions of the dehydrogenation component, the ion ratio of dehydrogenation component to alkaline earth metal in said solution being in the range of 1:1 to 1:200, which zeolite has uniform interstitial dimensions sufficiently small to exclude a remaining portion of said components, whereby the portion of the components admitted to contact with the active dehydrogenation surfaces preferentially undergo hydrocracking to the substantial exclusion of the remaining portion of the hydrocarbon charge.

7. The process of claim 6, wherein Group VIII metal is nickel.

8. The process of claim 6, wherein the Group VIII metal is cobalt.

9. The process of claim 6, wherein the Group VIII metal is platinum.

10. A process for selectively hydrocracking a hydrocarbon charge consisting of components of different molecular size which comprises contacting said charge in the presence of hydrogen at a temperature between about 550° F. and 790° F. under hydrocracking conditions with a crystalline aluminosilicate zeolite having rigid three-dimensional networks combined with a Group VIII metal-containing dehydrogenation component, a major portion of which is distributed within the interior of said crystalline aluminosilicate zeolite by contact with a solution containing ions of the metal corresponding to the metal cation of the crystalline aluminosilicate zeolite undergoing treatment, and ions of the dehydrogenation component, the ion ratio of dehydrogenation component to metal corresponding to the metal cation of said crystalline aluminosilicate being in the range of 1:5 to 1:100, which zeolite has uniform pores approximately 5 Angstroms in diameter capable of admitting a portion of said charge components, whereby the admitted portion of the charge making contact with active dehydrogenation surfaces undergoes hydrocracking to lighter products, and removing the products so obtained from the hydrocracking zone.

11. The process of claim 10, wherein the Group VIII metal is nickel.

12. The process of claim 10, wherein the Group VIII metal is cobalt.

13. The process of claim 10, wherein the Group VIII metal is platinum.

14. A process for selectively hydrocracking a hydrocarbon charge consisting of components of different molecular size which comprises contacting said charge in the presence of hydrogen at a temperature between 400° F. and 790° F. under hydrocracking conditions with a crystalline aluminosilicate zeolite combined with a dehydrogenation component, a major portion of which is distributed within the interior of said zeolite by growing crystals of said zeolite in the presence of a solution containing ions of said dehydrogenation component, which zeolite has uniform pores between about 4 and about 7 Angstroms in diameter capable of admitting a portion of said charge components, whereby the portion of said components admitted to contact with the active dehydrogenation surfaces preferentially undergo hydrocracking to the substantial exclusion of the remaining portion of said hydrocarbon charge.

References Cited
UNITED STATES PATENTS

| | | | |
|---|---|---|---|
| 2,983,670 | 5/1961 | Seubold | 208—110 |
| 3,039,953 | 6/1962 | Eng | 208—26 |

DELBERT E. GANTZ, *Primary Examiner.*

ALPHONSO D. SULLIVAN, *Examiner.*

A. RIMENS, *Assistant Examiner.*